US009092489B1

(12) United States Patent
Dasilva et al.

(10) Patent No.: US 9,092,489 B1
(45) Date of Patent: Jul. 28, 2015

(54) POPULAR MEDIA ITEMS DATA SET WITH EXPONENTIAL DECAY

(71) Applicant: Google Inc., Mountain View, CA (US)

(72) Inventors: Tim Dasilva, North Hills, CA (US); Philo Juang, Paris (FR)

(73) Assignee: GOOGLE INC., Mountain View, CA (US)

(*) Notice: Subject to any disclaimer, the term of this patent is extended or adjusted under 35 U.S.C. 154(b) by 190 days.

(21) Appl. No.: 13/791,400

(22) Filed: Mar. 8, 2013

(51) Int. Cl.
*G06F 17/30* (2006.01)

(52) U.S. Cl.
CPC .................................. *G06F 17/3053* (2013.01)

(58) Field of Classification Search
None
See application file for complete search history.

(56) References Cited

U.S. PATENT DOCUMENTS

| | | | | |
|---|---|---|---|---|
| 8,209,330 | B1* | 6/2012 | Covell et al. | 707/728 |
| 2007/0156887 | A1* | 7/2007 | Wright et al. | 709/224 |
| 2007/0239713 | A1* | 10/2007 | Leblang et al. | 707/6 |
| 2009/0150378 | A1* | 6/2009 | Skubacz et al. | 707/5 |
| 2010/0106730 | A1* | 4/2010 | Aminian et al. | 707/748 |
| 2010/0145927 | A1* | 6/2010 | Kasbekar et al. | 707/710 |
| 2011/0238754 | A1* | 9/2011 | Dasilva et al. | 709/204 |
| 2012/0095975 | A1* | 4/2012 | Billingsley et al. | 707/705 |
| 2012/0239643 | A1* | 9/2012 | Ekstrand et al. | 707/723 |
| 2013/0012124 | A1* | 1/2013 | Hymel et al. | 455/41.1 |

OTHER PUBLICATIONS

Broxton et al., "Catching a viral video," Dec. 17, 2011, 19 pages, Springer Science+Business Media, LLC.
Miller, Evan, "Rank Hotness With Newton's Law of Cooling," Feb. 15, 2009, 3 pages, Evanmiller.org, <http://www.evanmiller.org/rank-hotness-with-newtons-law-of-cooling.html>.
Cormode et al., "Exponentially Decayed Aggregates on Data Streams," 3 pages.
Corso et al., "Ranking a Stream of News," 10 pages, May 10-14, 2005, International World Wide Web Conference Committee.

* cited by examiner

*Primary Examiner* — Jay Morrison
(74) *Attorney, Agent, or Firm* — Lowenstein Sandler LLP

(57) ABSTRACT

A processing device computes scores for a plurality of media items. A score for a media item is computed by determining a plurality of positive user actions associated with the media item, combining a plurality of score contributions from the plurality of positive user actions to determine a value for the score, and applying an exponential decay to the value for the score. The media items are ranked based on the scores. One or more of the media items that have not been featured on any external website or that fail to satisfy another filtering criterion are filtered. A popular media item data set is then populated with highest ranked media items from a remainder of the plurality of media items.

28 Claims, 7 Drawing Sheets

POPULAR MEDIA ITEMS DATA SET WITH EXPONENTIAL DECAY

TECHNICAL FIELD

The present disclosure generally relates to media hosting and streaming, and more specifically to ranking the popularity of media items and generating a popular media items data set.

BACKGROUND

Video hosting servers may host millions of videos, with new videos being constantly uploaded to those servers. Many users are interested in watching the most popular videos.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an implementation of the present disclosure, a computing device computes scores for multiple media items such as videos. A score for a media item is computed by determining positive user actions associated with the media item, combining score contributions from the positive user actions to determine a value for the score, and applying an exponential decay to the value for the score. The media items are ranked based on the scores. One or more of the media items that have not been featured on any external website or that fail to satisfy another filtering criterion are filtered. A popular media item data set is then populated with highest ranked media items from a remainder of the media items.

In addition, methods and systems for performing the operations of the above described implementations are also provided. Further, a computer readable storage media is provided to store instructions for performing the operations of the above described implementations.

In one implementation a system includes means for computing scores for a plurality of media items. Computing a score for a media item of the plurality of media items includes determining a plurality of positive user actions associated with the media item, combining a plurality of score contributions from the plurality of positive user actions to determine a value for the score, and applying an exponential decay to the value for the score. The system additionally includes means for ranking the plurality of media items based on the scores, means for filtering out one or more of the plurality of media items that have not been featured on any external website, and means for populating a popular media item data set with highest ranked media items from a remainder of the plurality of media items.

The system may additionally include means for identifying, from the plurality of positive user actions, subscriber views from subscribers to a media content source of the media item and non-subscriber views from non-subscribers to the media content source, wherein a first score contribution is applied to subscriber views and a second score contribution is applied to non-subscriber views. The system may additionally include means for determining authors of the plurality of media items and means for filtering a first media item of the plurality of media items from the popular media items data set if the first media item is authored by an author of a second higher ranked media item in the popular media items data set. The system may additionally include means for determining a user engagement value for the media item based on at least one of user shares of the media item, user indications of interest in the media item, user comments on the media item, user forwarding of the media item and playlists incorporating the media item. The system may further include means for determining a views value for the media item based on a number of user views of the media item, determining a ratio between the views value and the user engagement value, and filtering the media item from the popular media items data set responsive to determining that the ratio fails to satisfy a first threshold. Moreover, the system may include means for boosting the score for the media item in response to determining that the ratio satisfies a second threshold.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
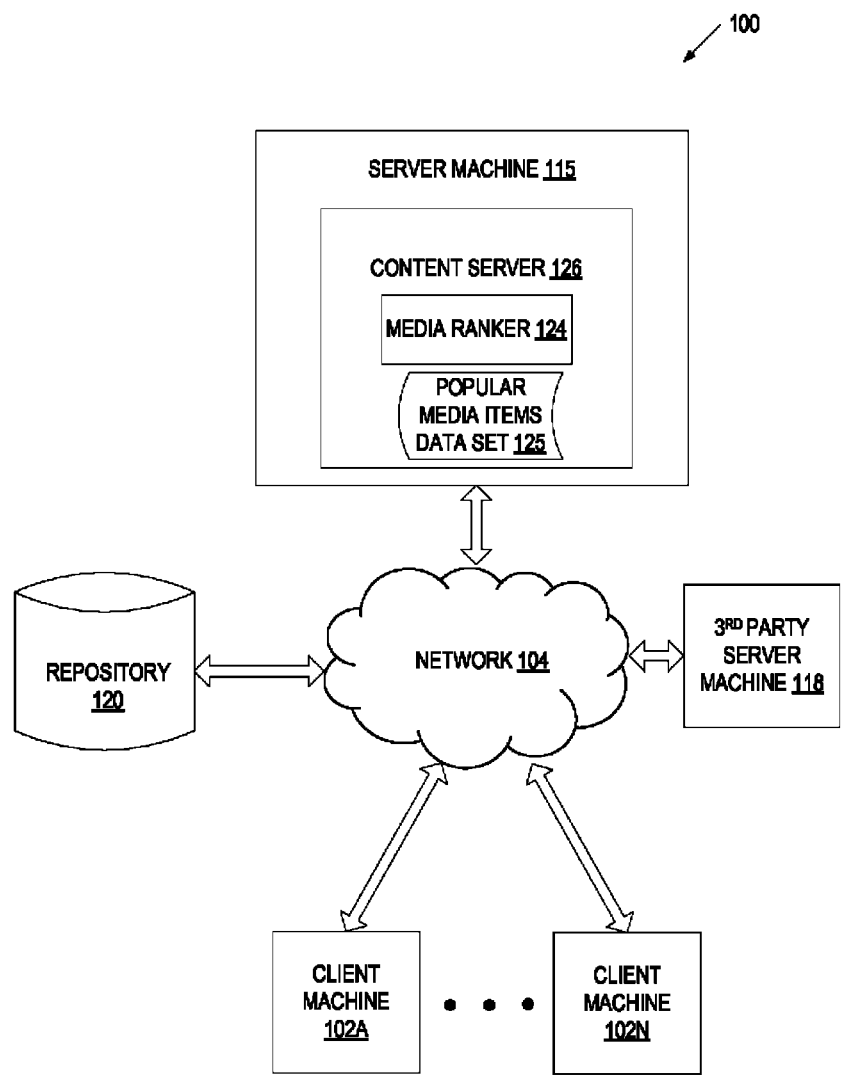
FIG. 1 illustrates an exemplary system architecture, in accordance with one implementation of the present disclosure.

Described herein are a system and method for ranking media items and populating a popular media items data set. Users visiting web sites of media hosting services (e.g., video hosting services) may desire to view most popular media items. Embodiments provide a popular media items data set that can enable such users to easily identify and view the most popular media items. In one example, a media hosting service determines scores for each of the media items and then ranks the media items based on their scores. The media hosting service may compute the score for a media item by determining positive user actions associated with that media item, then determining and adding up score contributions for those positive user actions. Such positive user actions may include views of a media item, shares of the media item, comments on the media item, and so on. The media hosting service then applies an exponential decay to the score. Media items are additionally filtered out based on one or more filtering criteria.

Embodiments provide techniques for populating the popular media items data set with media items that are current and popular. The described techniques provide a diverse set of media items, and ensure that extremely popular media items will stay on the popular media items data set if their popularity continues to grow, while also ensuring that the popular media items data set will not remain static with just those same extremely popular media items. Experimental results have shown that adoption of the described techniques for populating the popular media items data set results in an approximately 40% increase in average view time for users exposed to media items from the popular media items data set.

Note that some implementations of the present disclosure are discussed with reference to videos and/or media content sources (e.g., channels) that provide videos. Such videos may be digital videos, and may be encoded in numerous different formats, such as the Windows Media®, Real Media®, Audio Video Standard (AVS), Theora®, VP8, WebM, VC-1, Quicktime®, MPEG-4 (also known as MP4), Flash®, MPEG-2, DivX®, audio video interlace (AVI), or advanced video coding (AVC) video file formats. Though some implementations may be discussed with reference to videos and channels, implementations of the present disclosure also apply to other digital media items such as images, text strings, audio files and so forth. Additionally, implementations apply to media content sources other than channels, such as social network profiles, feeds, accounts, and so forth. Examples of audio files to which implementations of the present disclosure may apply include digital music and other audio clips such as moving picture experts group (MPEG) audio layer 3 (MP3) files, advanced audio coding (AAC) files, waveform audio file format (WAV) files, audio interchange file format (AIFF) files, Apple® Lossless (m4A) files, etc. Examples of image files to which the implementations of the present disclosure may apply include joint photographic experts group (JPEG) files, portable network graphics (PNG) files, bitmap image (BMP) files, graphics interchange format (GIF) files, and so forth.

FIG. 1 illustrates an example system architecture 100, in accordance with one implementation of the present disclosure. The system architecture 100 includes a server machine 115, a repository 120 and client machines 102A-102N connected to a network 104. The system architecture 100 may also include a third party server machine 118 connected to the network 104. Network 104 may be a public network (e.g., the Internet), a private network (e.g., a local area network (LAN) or wide area network (WAN)), a cellular network, a broadcast network, or a combination thereof.

The client machines 102A-102N may be personal computers (PCs), laptops, mobile phones, tablet computers, set top boxes, televisions, video game consoles, digital assistants or any other computing devices. The client machines 102A-102N may run an operating system (not shown) that manages hardware and software of the client machines 102A-102N. A browser (not shown) may execute on some client machines (e.g., on the OS of the client machines). The browser may be a web browser that can access content served by a content server 126 by navigating to web pages of the content server 126 (e.g., using the hypertext transport protocol (HTTP)). The browser may issue queries and commands to the content server 126, such as commands to access a specific video, commands to share a video, commands to optimize the video, and so forth.

Some client machines 102A-102N include applications that are associated with a service provided by content server 126. Examples of client machines that may use such applications ("apps") include mobile phones, "smart" televisions, tablet computers, and so forth. The applications or apps may access content provided by content server 126, issue commands to content server 126, receive content from content server 126, and so on without visiting web pages of content server 126.

Via an app or a browser, the client machines 102A-102N may access a popular media items data set 125 provided by content server 126. In one embodiment, the popular media items data set 125 is provided as a channel or other media content source that clients may subscribe to. Users may select media items from the media items data set 125 for viewing via the app or browser. The app or browser of the client machine 102A-102N may then receive media items that are in the popular media items data set 125. Additionally, the client machines 102A-102N may also upload media items to the content server 126 for storage in a repository 120 via the app or browser.

Server machine 115 may be a rackmount server, a router computer, a personal computer, a portable digital assistant, a mobile phone, a laptop computer, a tablet computer, a netbook, a desktop computer, a media center, or any combination of the above. Server machine 115 includes content server 126 that serves media items from repository 120 to client machines 102A-102N. Content server 126 may be a video hosting service that offers a multitude of channels, with each channel providing a collection of videos. A video channel may include videos sharing common metadata (e.g., artist, genre, title, etc.), videos uploaded by the same user and/or videos in a user-created playlist. Each channel may be a media content source. The videos in a channel are typically uploaded or selected by a particular entity (e.g., a user that curates the channel). Channels may be dedicated to particular subjects or may have particular themes. Examples of channels include comedy channels, music video channels, gaming channels, automotive channels, sports channels, and so forth. Channels can also be associated with a particular entity (e.g., a particular user), without being dedicated to any specific topic. Users that subscribe to a channel may receive videos from that channel for viewing. Alternatively, content server may host other types of media items, such as images, audio, text strings, user profiles, and so forth.

Content server 126 may include a media ranker 124 that generates a popular media items data set. Media ranker 124 may determine the popularity scores for media items based on user views and/or user engagement with those media items. Media ranker 124 may additionally apply an exponential decay to the scores. After scores have been decayed, the scores may be ranked. Those scores having highest rankings (e.g., the 10 highest ranked media items in one example) may then be included in the popular media items data set. Media ranker 124 may also filter media items from the popular media items data set based on filtering criteria. For example, media items that have not been featured on an external website may be filtered from the popular media items data set 125. Media ranker 124 is described in greater detail below with reference to FIG. 2.

In general, functions described in one embodiment as being performed by the content server 126 can also be performed on the client machines 102A-102N in other embodiments if appropriate. In addition, the functionality attributed to a particular component can be performed by different or multiple components operating together. The content server 126 can also be accessed as a service provided to other systems or devices through appropriate application programming interfaces, and thus is not limited to use in websites.

Repository 120 is a persistent storage that is capable of storing media items such as video files, text strings, images, audio files, and so forth. As will be appreciated by those skilled in the art, in some implementations repository 120 might be a network-attached file server, while in other implementations repository 120 might be some other type of persistent storage such as an object-oriented database, a relational database, and so forth, that may be hosted by the server machine 115 or one or more different machines coupled to the server machine 115 via the network 104. The media items stored in the repository 120 may include user generated content that is uploaded by client machines 102A-102N. The media items may additionally or alternatively include content provided by other entities (e.g., service providers such as news organizations, publishers, libraries and so on). Media items may or may not be associated with particular media content sources 122.

Content server 126 may receive media items from client machines (also referred to herein as clients) 102A-102N and/or a third party server machine 118, and store those media items in repository 120. Uploaded media items may be associated with particular media content sources 122 (e.g., an account or channel of an entity that uploaded the media items). In the example of videos, content server 126 may stream selected videos to clients 102A-102N, or may download the videos to the clients 102A-102N. In streaming, the clients 102A-102N can begin playback of the video before receiving the entire video. In contrast, with downloading the video typically is not playable until a complete file is received by the client 102A-102N.

Figure 2:
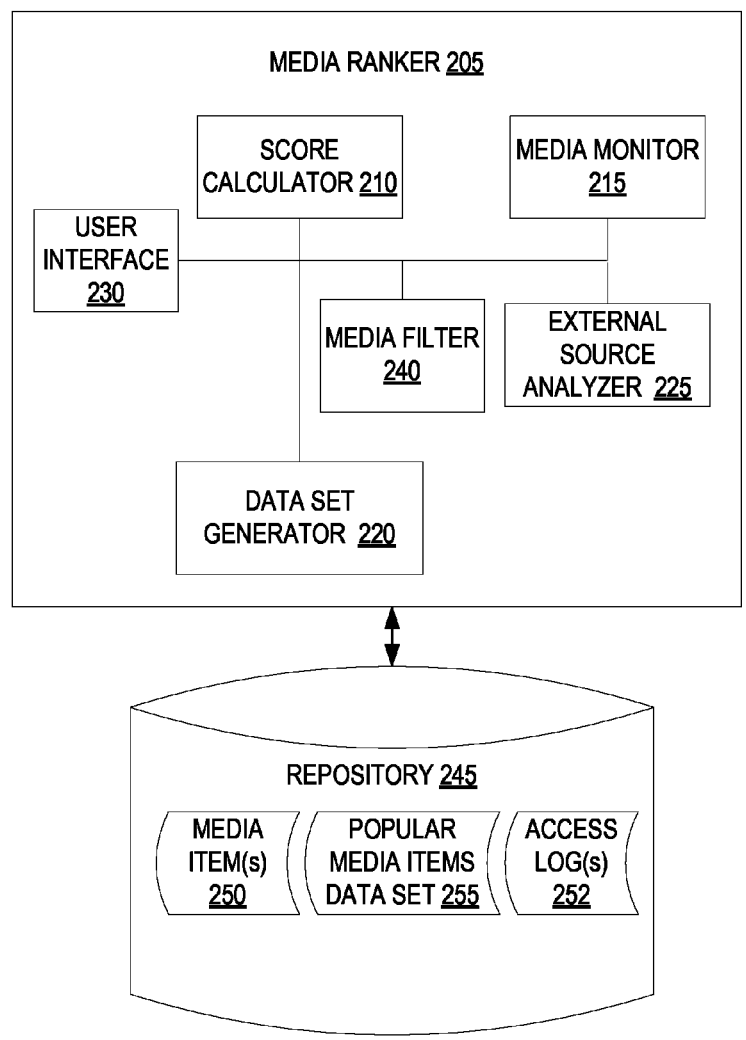
FIG. 2 is a block diagram of a media ranker, in accordance with one implementation of the present disclosure.

FIG. 2 is a block diagram of a media ranker 205, in accordance with one implementation of the present disclosure. The media ranker 205 may include a user interface 230, a score calculator 210, a media monitor 215, a data set generator 220, an external source analyzer 225 and/or a media filter 240. Note that in alternative implementations, the functionality of one or more of the user interface 230, score calculator 210, media monitor 215, data set generator 220, external source analyzer 225 and/or media filter 240 may be combined into a single module or divided into multiple modules. In one implementation, media ranker 205 corresponds to media ranker 124 of FIG. 1.

Media ranker 205 may be coupled to a repository 245, which may store media items 250, access logs 252 and/or popular media item data sets 255. The access logs 252 may include records of user actions (e.g., positive user actions) associated with media items. Alternatively, different types of data may be stored in different repositories. For example, access logs 252 may be stored in a separate repository than media items 250.

In one embodiment, the repository 245 stores a record of all users who have registered an account with a content server. Each registered account may include a user name and e-mail address associated with the account. A registered account may also include information about the user associated with the account such as their name, hobbies, age, uploaded videos, favorite videos, and/or playlists of videos created by the users. Such information may be used to adjust scoring of media items for those users, and therefore to adjust the popular media items data set for those users.

In situations in which the systems discussed here collect personal information about users, or may make use of personal information, the users may be provided with an opportunity to control whether programs or features collect user information (e.g., information about a user's actions or activities, user's preferences, user's age, etc.), or to control whether and/or how to receive content from the content server that may be more relevant to the user. In addition, certain data may be treated in one or more ways before it is stored or used, so that personally identifiable information can be determined for the user. Thus, the user may have control over how much information is collected about the user and used by a content server.

Media monitor 215 may monitor the media items 250 accessed by users. Media monitor 250 may add entries to access log 252 for each positive user action and/or negative user action associated with a media item. Each entry in an access log 252 may identify a media item being accessed, a time of access, a device identifier (ID) if available, data identifying the type of interaction with the media item, and so forth. Interaction types can include any user interaction, such as playing, saving, rating, sharing, pausing, rewinding, viewing, commenting, and forwarding a media item. Another example of a type of interaction is subscribing to a media content source associated with the media item subsequent to viewing the media item. Another type of user action is indicating that a user "likes" a media item by pressing a "like" button. Entries may also include additional information such as an indication as to whether a user who accessed the media item is a subscriber to a media content source associated with the media item. Entries may also indicate how long a user viewed a media item.

Score calculator 210 calculates popularity scores for media items 250. Such scoring may be performed based on the access logs for those media items 250. To compute the score for a media item, score calculator 210 may identify the positive user actions associated with a media item based on the access log 252 for that media item. Score calculator 210 may then determine a score contribution for each of those positive user actions. In one embodiment, positive user actions are each given the same set score contribution amount, causing the score to increase linearly with positive user actions. Alternatively, different positive user actions may be assigned different score contributions. For example, user views of videos that are longer than a first view length threshold may be assigned a first score contribution, while user views of videos that are longer than a second view length threshold may be assigned a second score contribution. The view length threshold may be a percentage of a video length (or other media item duration) or a particular length of time (e.g., 8 minutes). In one embodiment, the view length threshold is whichever is shorter between a percentage of a video length and a set duration. For example, a first view length threshold may be 30% of a video's duration, while a second view length threshold may be 70% of the video's duration. In such an instance, a user view of at least 30% of the video may be assigned a first score contribution (e.g., of 1) while a user view of less than 30% may be assigned a score contribution of zero. Similarly, a user view of at least 70% of the video may be assigned a second higher score contribution (e.g., of 1.5).

In another example, media items may be associated with a particular media content source. Views from users who subscribe to that media content source may be assigned a first score contribution, while views from users who do not subscribe to the media content source may be assigned a second higher score contribution. For example, views from subscribers may be assigned a score contribution of 0.5, while views from subscribers may be assigned score contributions of 1. Additionally, user shares or comments of a media item may be assigned higher score contributions than user views of the media item in some implementations.

In one implementation, multipliers or weights are applied to a base score contribution value (e.g., of 1). The multipliers may be applied based, for example, on the above described factors. Accordingly, multiple factors may increase and/or decrease a score contribution for a positive user action. In one example, a first user who is a subscriber to a media content source providing a video views 40% of the video. A second user who is not a subscriber to the media content source views 80% of the video. The score contribution for the first view by the subscriber may be computed by multiplying a base score contribution of 1 by 0.5 (because the viewer was a subscriber) and by 1 (because the view was of more than 30% of the video). Thus, the score contribution for the first view is 0.5. The score contribution for the second view by the non-subscriber may be computed by multiplying the base score contribution of 1 by 1 (because the view was from a non-subscriber) and by 1.5 (because the view was of more than 70% of the video). Thus, the score contribution for the second view is 1.5.

Score calculator 210 may add up the score contributions for all of the positive user actions indicated in the access logs to compute a score value. If a previous score value had already been computed for the media item, then the positive user actions may be those user actions that occurred after the previous score value was calculated. In such an instance, the computed score value may be added to the previous score value.

Note that implementations are discussed herein with reference to computing popularity scores for media items based on positive used actions. However, it should be understood that negative user actions may also be used to compute the popularity scores. Examples of negative user actions include, for example, negative user comments on a media item. Negative user actions may be processed in a similar manner as described below with reference to positive user actions. However, negative user actions may be assigned negative score contributions rather than positive score contributions.

Score calculator 210 may apply multipliers to popularity scores of media items based on one or more additional factors. In one embodiment, score calculator 210 determines whether a media item has been featured by an external news source. If so, score calculator 210 may boost the popularity score for that media item by applying a multiplier (e.g., a weight) of, for example, 1.25 (to increase the score by 25%). Alternatively, score calculator 210 may determine whether the media item has been externally featured (e.g., not just by news services), and may boost the popularity score for the media item if it has been externally featured.

In one embodiment, score calculator 210 compares demographics of viewership for a media item to demographics of a broader user base. If the demographics differ by more than a threshold amount, score calculator may reduce the score for that media item by applying a multiplier that is smaller than 1 (e.g., 0.8). Note that popularity scores may be computed for a general audience or for a specific audience. For example, popularity scores may be computed for a particular user based on information regarding that user's demographics, likes and dislikes. If a popularity score is computed for a particular user, a multiplier may be applied to a media item's score based on a similarity between that user's demographics, likes and dislikes and the viewership demographics, likes and dislikes for that media item. Accordingly, media items that appeal to a particular niche may be given a boost in popularity for members of that niche.

In one embodiment, the source of positive user actions is tracked. Therefore, positive user actions (e.g., views) that originate from a particular content server that hosts media items may be distinguished from positive user actions originating from external sources. Positive user actions originating from external sources may be weighted more heavily than positive user actions originating from the content server. For example, a multiplier of 1.3 may be applied to positive user actions originating from external sources. This may help minimize an effect of media items becoming more popular simply by being included in the popular media items data set.

Score calculator 210 may exponentially decay the popularity score value by applying an exponential decay factor. In one embodiment, an exponential decay factor with a half life of one day is used. In an alternative embodiment, the exponential decay factor may depend on an age of the media item. For example, a first exponential decay factor (e.g., a first half life of 1 day) may be used if the media item has an age that is less than an age threshold. However, a second exponential decay factor (e.g., a second half life of 12 hours) may be used if the media item has an age that is more than the age threshold. The age threshold may be 4 days, 5 days, or some other value. This may be considered a stepwise function for the exponential decay factor based on age. Alternatively, the exponential decay factor may be a continuous or approximately continuous function of age. For example, the exponential decay factor may be computed as an inverse of age, so that as the age increases the exponential decay factor shortens. One possible function for the exponential decay factor is:

$$t_{1/2}(x)=t_i-xy$$

where $t_{1/2}$ is the half life applied to a media item at age x, x is the age of the media item, $t_i$ is the initial half life for the media item and y is a multiplier that controls how fast to reduce the half life with time. Modifying the exponential decay factor based on age has the effect of making it progressively more difficult for media items to remain on a popular media items data set 255 as they age.

In addition to or instead of applying multipliers to a media item's score based on the factors described above (or other factors), an exponential decay factor may be adjusted based on these factors. For example, the popularity of a media item may be decayed more slowly (by applying a longer decay factor) for users who are members of a niche associated with the media item. Additionally, the media item's popularity score may be decayed more slowly if it has been featured by an external news service.

Once scores have been computed for multiple media content sources, media source ranker 220 ranks the media content sources 255 based on their scores. Media content sources having higher scores may be more likely to be of interest to a user, whereas media content sources having lower scores may be less likely to be of interest to the user. Accordingly, media content sources 255 having the highest scores may be ranked ahead of media content sources 255 having lower scores.

Media filter 240 may perform an analysis of media items to determine which media items satisfy one or more filtering criteria. One possible filtering criterion is an external reference criterion. External source analyzer 225 may access one or more external services or web sites to identify those services or web sites that have featured media items. For example, external source analyzer 225 may scrape the web sites or feeds (e.g., really simple syndication (RSS) feeds) of blogs, news services, social networking services, and so forth to identify featured media items. An externally featured media item may be a media item that has been embedded in an external web service or RSS feed, or a media item that has been otherwise referenced or mentioned in an external web service or RSS feed. External source analyzer 225 may update the access logs 252 of those media items that are externally featured by adding an externally featured tag to the access logs 252. In one embodiment, external source analyzer 225 additionally notes in the access logs 252 whether a media item has been externally featured by a news service. Media filter 240 may determine whether to filter media items based on whether they have been externally featured using an external reference criterion.

Other filtering criteria may also be used to filter out media items from a popular media items data set. For example, another possible criterion is a general audience suitability criterion that filters out media items if they are unsuitable for a general audience (e.g., if they are violent, racy, and so forth). Another possible criterion is a views to engagement ratio criterion that filters out media items if they have not received an adequate amount of user engagement as set according to a number of recorded views. Another possible criterion is an author criterion that filters out media items based on an author. Examples of filtering criteria are discussed in greater detail below with reference to FIG. 6.

Once media items 250 have been scored and filtered, data set generator 220 may rank the media items based on their scores. Media items having the highest scores may be ranked ahead of media items having lower scores. Data set generator 220 may then generate a popular media items data set 255 and/or update an existing media items data set 255 with the most popular media items (e.g., those having the highest ranks). This popular media items data set 255 may then be presented to users.

User interface 230 may provide the popular media items data set 255 for recommendation and display to users. The user may also be provided with an option to view additional media items with lower rankings (e.g., by pressing a "show more" button). The user may select an identified media for viewing (e.g., for playback).

In some implementations, the popular media items data set is created for a particular region (e.g., a particular country) from media items uploaded from that particular region. In such an instance, the popularity for the media items may be computed from positive user actions by users located in that region. In other implementations, a global popular media items data set is created from media items uploaded from multiple regions (e.g., multiple countries), and popularity scores are computed based on user actions from users in the multiple regions. Additionally, a global popularity score and one or more local popularity scores may be computed for media items. The global and local popularity scores for a media item may be combined for an aggregate popularity score. In such an aggregate, the local popularity score associated with a particular region may be weighted more heavily than the global popularity score and/or the local popularity scores for other regions. A popular media items data set for a particular region may be based on the aggregate popularity score.

Category specific popular media items data sets may be generated in addition to a general popular media items data set. For example, different popular media items data sets may be created for the categories of sports, news, gaming, comedy, and so forth. Media items may be designated for a particular category based on a media content source and/or an uploader. Alternatively or additionally, the category may be computed by a content server.

FIGS. 3-6 are flow diagrams of various implementations of methods related to generating a popular media items data set. The methods are performed by processing logic that may include hardware (circuitry, dedicated logic, etc.), software (such as is run on a general purpose computer system or a dedicated machine), or a combination of both. In one implementation, the methods are performed by the server machine 115 of FIG. 1. The methods may be performed, for example, by media ranker 124 executing on server machine 115 or another machine.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
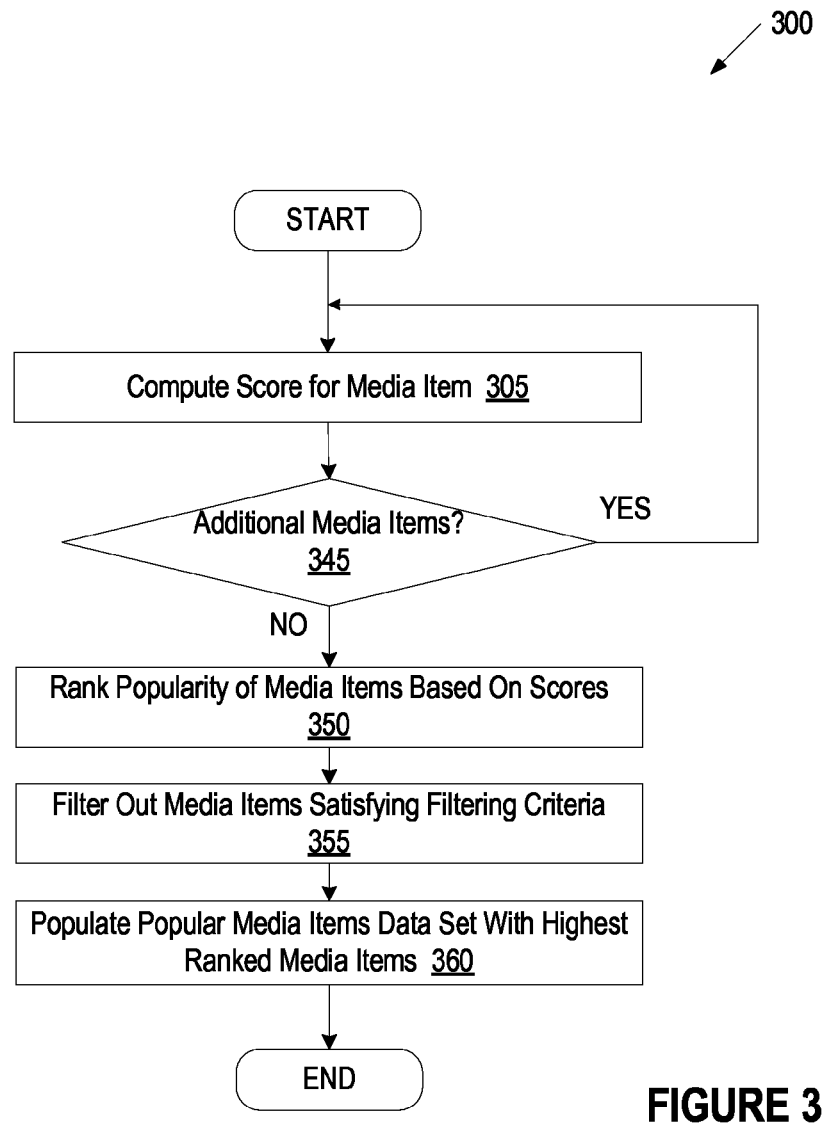
FIG. 3 is a flow diagram illustrating one implementation for a method of creating a popular media items data set.

FIG. 3 is a flow diagram illustrating one implementation for a method 300 of generating a popular media items data set. The popular media items data set may be a list, table or other data structure with the most popular media items hosted by a content service. At block 305 of method 300, processing logic identifies a media item and computes a popularity score for that media item. The popularity score for the media item may be computed as set forth below with reference to FIG. 4. The media item may be a video, text string, post from a social network account, image, song, and so forth.

At block 345, processing logic determines whether there are any additional media items that have not had their popularity scores computed. If any such media items are identified, the method returns to block 305, and a next media item is scored. Note that many media items may be scored in parallel.

At block 350, processing logic ranks the media items based on their scores. At block 355, processing logic filters out media items satisfying one or more filtering criteria. The filtering may be performed in accordance with filtering method 600 described below with reference to FIG. 6 in one implementation. At block 360, processing logic populates a popular media items data set with highest ranked media items. The popular media items data set may then be provided to client devices for presentation to users.

Figure 4:
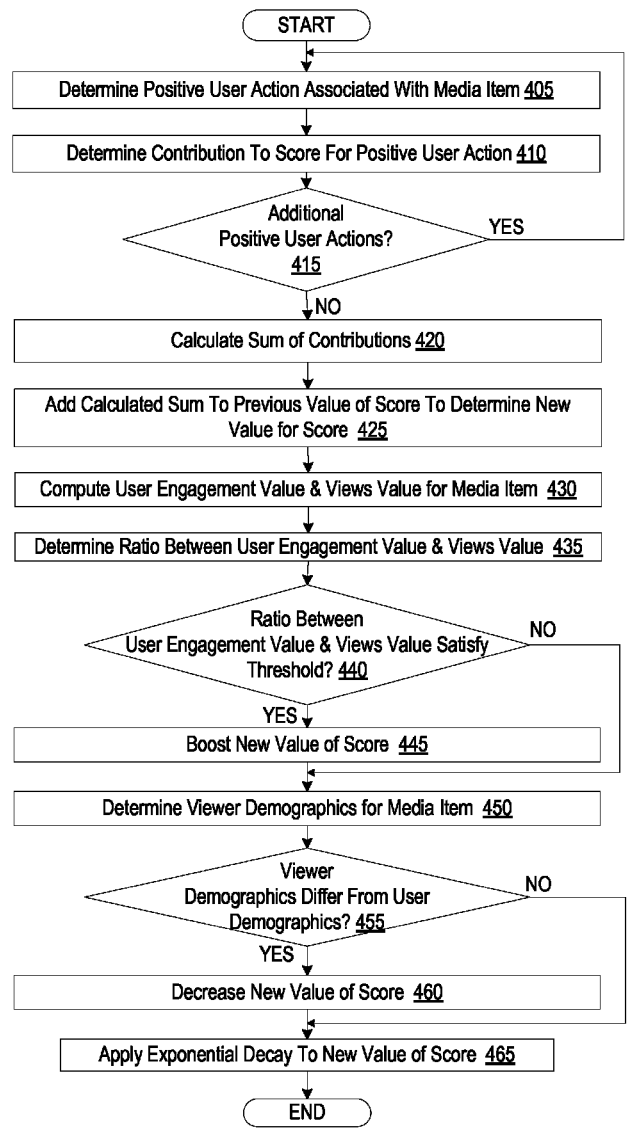
FIG. 4 is a flow diagram illustrating one implementation for a method of computing a score for a media item.

FIG. 4 is a flow diagram illustrating one implementation for a method 400 of scoring a media item. At block 405 of method 400, processing logic determines a positive user action associated with a media item. The positive user actions may be recorded in an access log.

At block 410, processing logic determines a contribution to a popularity score for the media item based on the positive user action. For example, processing logic may use one or more weighting rules to determine how much of a score contribution should be applied for a positive user action. The contribution may be based on the type of positive user action. Other variables may also affect the level of contribution for a positive user action. One implementation for determining a score contribution for a positive user action is set forth below with reference to FIG. 5.

At block 415, processing logic determines whether there are any additional positive user actions for which a score contribution has not been determined. If any such positive user actions are identified, the method returns to block 405. Note that score contributions for multiple positive user actions may be determined in parallel.

At block 420, processing logic calculates a sum of the determined score contributions. At block 425, processing logic adds the calculated sum to a previous value of the media item's popularity score to determine a new value of the popularity score.

The value of the popularity score may be boosted or decreased based on one or more additional factors. Some of those factors are discussed with reference to blocks 430-460. However, other factors may also be used to increase or decrease a popularity score for a media item. Moreover, those factors set forth may not be applied in some implementations.

At block 430, processing logic computes a user engagement value and a views value for the media item. The user engagement value may be computed based on a number of different types of user activities, all of which may reflect a level of user engagement with the media item. Such user activities may include user comments on the media item, user shares of the media item, user posts of the media item to external web sites, user references to the media item in external services such as social media services, user "likes" of the media item, and so on. The user views value may be computed from the number of user views that the media item has received and/or based on the length of the user views.

At block 435, processing logic determines a ratio between the user engagement value and the user views value. If there is a higher than average level of user engagement for a media item having a particular number of views, then this may indicate that the media item is popular. Accordingly, it may be useful to inflate the popularity score for that media item. At block 440, processing logic determines whether the ratio between the user engagement value and the views value satisfies a threshold. If the ratio satisfies the threshold, the method proceeds to block 445. Otherwise, the method proceeds to block 450.

At block 445, the new value of the score is boosted. The amount that the score is boosted may depend at least partially on the ratio. For example, an average ratio between user engagement and user views may be 100 user views for every user activity representative of user engagement (e.g., 100:1). If a media item has a ratio of 2 user views for every user activity representative of user engagement, then the popularity score may be increased by a first multiplier (e.g., multiplied by 1.2 in one example). If the media item has a ratio of 5 user views for every user activity representative of user engagement, then the popularity score may be increased by a second multiplier (e.g., multiplied by 1.4 in one example).

Some media items may appeal to a specific cross section of a media hosting service's user base, but may not appeal to other users. For example, a video or screen shot showing a scene from a computer game may be very popular among some viewers, but may not appeal to others. At block 450, processing logic determines viewer demographics for the media item. Viewers may have user accounts that include demographic information such as age, gender, hobbies, and so forth. Statistics on viewer demographics may be computed using such information. At block 455, processing logic compares the statistics on the viewer demographics for the media item to viewer demographics of a broader user base. For example, the viewer demographics for the media item may be compared to user demographics for all users of a media hosting service or to demographics of a general population of a region such as a nation. If processing logic determines that the viewer demographics differ from the user demographics by more than a threshold amount, the method continues to block 460 and processing logic decreases the new value of the score for the media item. For example, processing logic may apply a multiplier such as 0.8 to the popularity score for the media item. Otherwise, the method proceeds to block 465.

At block 465, processing logic applies an exponential decay to the new value of the popularity score. The exponential decay may have a specified half life, which may be 12 hours, 1 day, 2 days, or some other value. Alternatively, the exponential decay may have a computed half life that is a function of an age of the media item. The method then ends.

Figure 5:
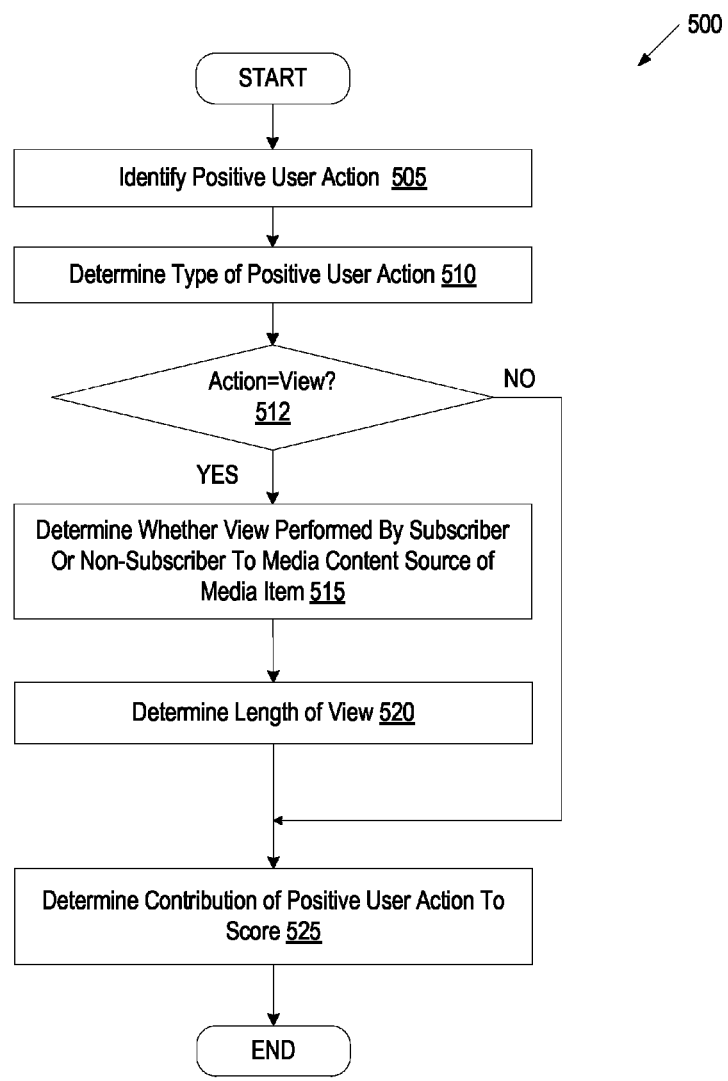
FIG. 5 is a flow diagram illustrating one implementation for a method of determining a score contribution of a positive user action for a media item.

FIG. 5 is a flow diagram illustrating one implementation for a method 500 of determining a score contribution to a popularity score of a media item for a positive user action. At block 505 of method 500, processing logic identifies a positive user action. At block 510, processing logic determines a type for the positive user action. For example, processing logic may determine whether the positive user action was a view, a comment, a recommendation, a forward, a share, a posting, a "like", and so on. At block 512, processing logic determines whether the positive user action was a view. If the positive user action was a view, the method proceeds to block 515. Otherwise, the method continues to block 525.

At block 515, processing logic determines whether the view was performed by a subscriber or a non-subscriber to a media content source of the media item. Views from subscribers may be assigned lower score contributions than views from non-subscribers. At block 520, processing logic determines a length of the view. Longer views may indicate a greater level of interest in the media item. For example, a first user who views a video through 60% of the video is probably more interested in the video than a second user who views the video for 30% of the video. Accordingly, a higher score contribution may be assigned to a long view of the media item than to a short view of the media item.

At block 520, processing logic determines a contribution of the positive user action to the popularity score for the media item. The contribution may be based on the type of positive user action, the length of a view and/or whether the positive user action was from a subscriber or a non-subscriber to a media content source that provided the media item. The method then ends.

Figure 6:
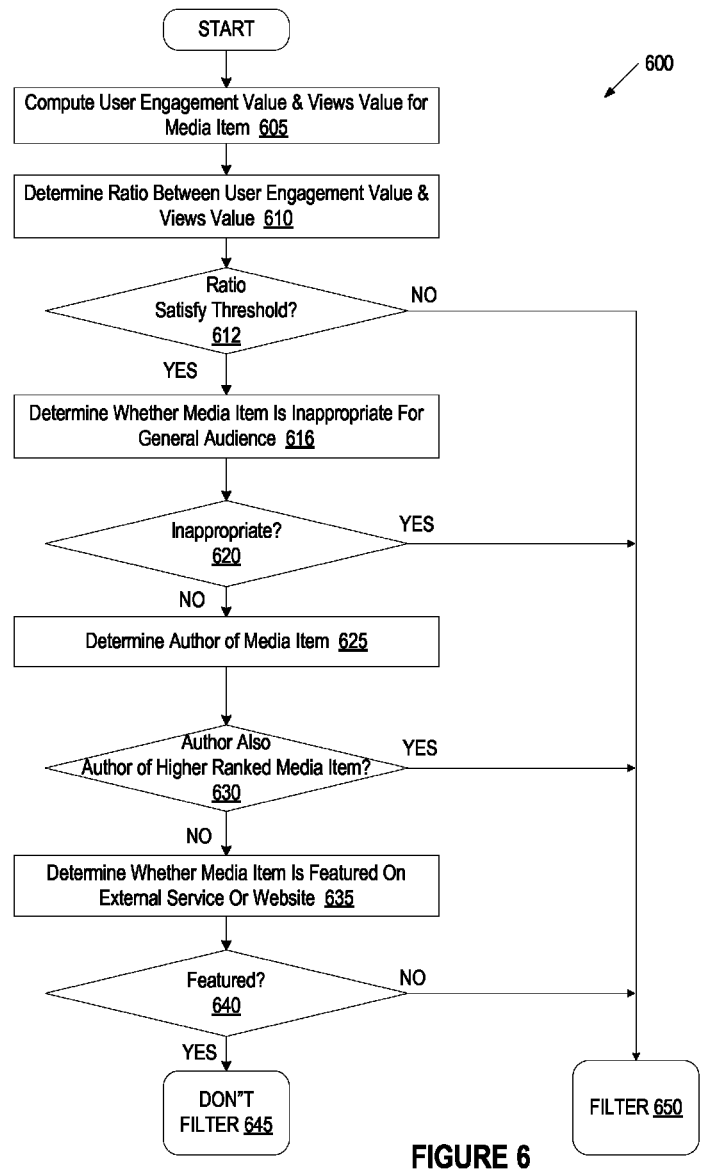
FIG. 6 is a flow diagram illustrating one implementation for a method of filtering media items from a popular media items data set.

FIG. 6 is a flow diagram illustrating one implementation for a method 600 of filtering a media item from a popular media items data set. At block 605 of method 600, processing logic computes a user engagement value and a views value for a media item. At block 610, processing logic determines a ratio between the user engagement value and the views value. For example, the ratio may be 10 views for every user engagement action. At block 612, if the ratio satisfies a threshold, the method continues to block 616. If the ratio fails to satisfy the threshold, the method continues to block 650 and the media item is filtered. For example, the threshold may be one user engagement action for every 100 views. If there are fewer than 1 user engagement action for every hundred views, then the ratio may fall short of the threshold.

At block 616, processing logic determines whether the media item is appropriate for a general audience. For example, processing logic may compute a "raciness" value for a media item based on vulgarity and/or sexual content. Processing logic may also determine a violence value for the media item. If the raciness value exceeds a raciness threshold or the violence value exceeds a violence threshold, then the media item may be identified as inappropriate for a general audience (e.g., inappropriate for children). At block 620, if the media item is identified as inappropriate for a general audience, then method proceeds to block 650 and the media item is filtered. Otherwise, the method continues to block 630.

At block 630, processing logic identifies an author (e.g., a media content source) of the media item. Processing logic then determines whether the author of the media item is also the author of any other media items that have higher popularity scores (e.g., higher ranked media items). If the media item has an author of a higher ranked media item, the method proceeds to block 650 and the media item is filtered. Otherwise, the method continues to block 635.

At block 635, processing logic determines whether the media item has been featured on any external service or website. This may be determined by performing scraping of feeds such as RSS feeds, and/or by performing page scraping of external websites affiliated with blogs, news services, social media services, and so forth. If the media item has not been featured on any external website or has not been featured by any external service, the method proceeds to block 650 and the media item is filtered. If the media item has been externally featured, the method continues to block 645 and processing logic determines not to filter the media item.

Figure 7:
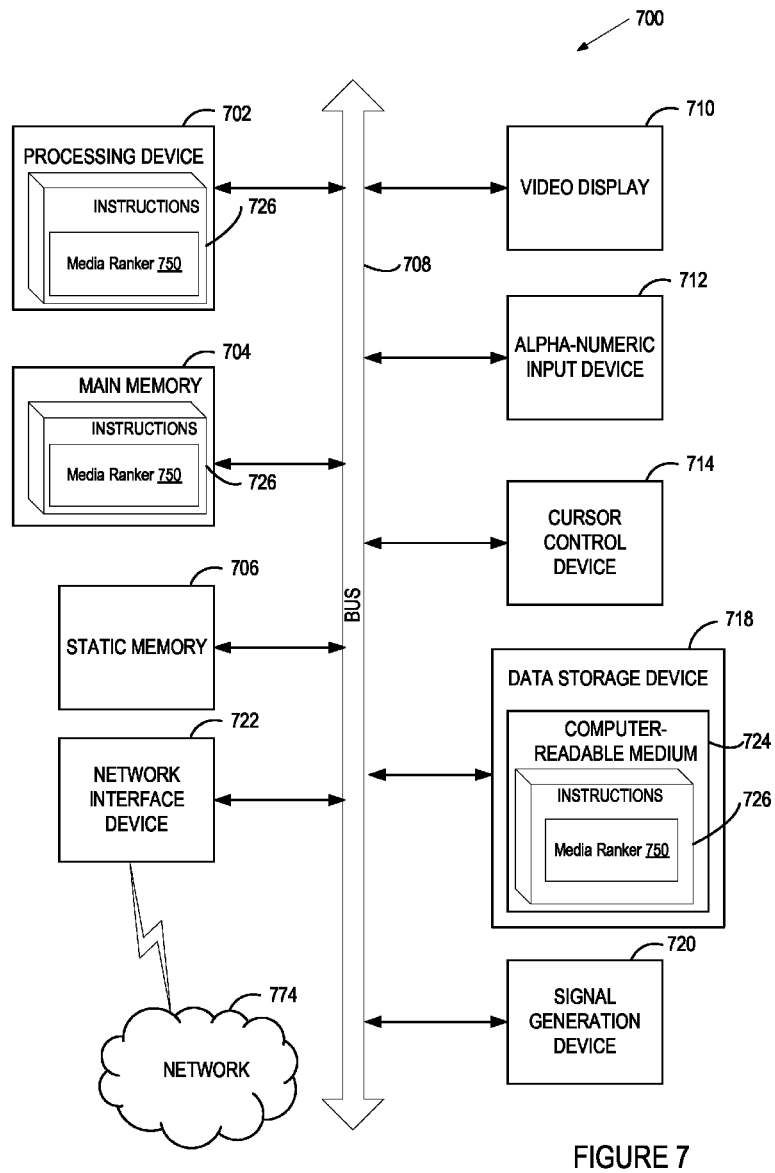
FIG. 7 is a block diagram of an exemplary computer system that may perform one or more of the operations described herein.

FIG. 7 illustrates a diagrammatic representation of a machine in the exemplary form of a computing device 700 within which a set of instructions, for causing the machine to perform any one or more of the methodologies discussed herein, may be executed. In some implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a television, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable medium 724 on which is stored one or more sets of instructions 726 (e.g., software) embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable media.

In one implementation, the instructions 726 include instructions for a media ranker 750, which may correspond to media ranker 205 of FIG. 2, and/or a software library containing methods that call a media ranker. While the computer-readable medium 724 is shown in an exemplary implementation to be a single medium, the term "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that cause the machine to perform any one or more of the methodologies of the present disclosure. The terms "computer-readable medium" and "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing", "ranking", "determining", "enabling", "identifying," "calculating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   computing, by a processing device, scores for a plurality of media items hosted by a content hosting platform, wherein computing a score for a media item of the plurality of media items comprises:
      determining a plurality of positive user actions associated with the media item;
      combining a plurality of score contributions from the plurality of positive user actions to determine a value for the score; and
      applying an exponential decay to the value for the score;
   ranking the plurality of media items based on the scores;
   filtering out one or more of the plurality of media items that have not been featured by any source external to the content hosting platform; and
   populating a popular media item data set with highest ranked media items from a remainder of the plurality of media items, wherein the highest ranked media items have been featured by at least one source external to the content hosting platform.

2. The method of claim 1, wherein computing the score for the media item further comprises:
   adding the plurality of score contributions to a previous value for the score, wherein the determined plurality of positive user actions are those positive user actions that occurred after the previous value was computed.

3. The method of claim 1, wherein the plurality of media items comprise a plurality of videos and the plurality of positive user actions comprise a plurality of user views.

4. The method of claim 3, wherein the plurality of user views comprise a first set of user views having durations that satisfy a first duration threshold and a second set of user views with durations that satisfy a second duration threshold, and wherein a first score contribution is applied to user views from the first set and a second score contribution is applied to user views from the second set.

5. The method of claim 3, further comprising:
   identifying, from the plurality of user views, subscriber views from subscribers to a media content source of the media item and non-subscriber views from non-subscribers to the media content source, wherein a first score contribution is applied to subscriber views and a second score contribution is applied to non-subscriber views.

6. The method of claim 3, wherein the plurality of positive user actions further comprises at least one of a plurality of user indications that users like the media item, a plurality of user shares of the media item, or a plurality of user comments on the media item.

7. The method of claim 1, further comprising:
   determining authors of the plurality of media items; and
   filtering a first media item of the plurality of media items from the popular media items data set if the first media item is authored by an author of a second higher ranked media item in the popular media items data set.

8. The method of claim 1, wherein computing the score for the media item further comprises:
   determining a user engagement value for the media item based on at least one of user shares of the media item, user indications of interest in the media item, user comments on the media item, user forwarding of the media item and playlists incorporating the media item;
   determining a views value for the media item based on a number of user views of the media item;
   determining a ratio between the views value and the user engagement value; and
   filtering the media item from the popular media items data set responsive to determining that the ratio fails to satisfy a first threshold.

9. The method of claim 8, further comprising:
   boosting the score for the media item responsive to determining that the ratio satisfies a second threshold.

10. The method of claim 1, wherein the applied exponential decay has a first exponential decay factor if an age of the media item is less than a threshold age and a second exponential decay factor if the age of the media item is greater than the threshold age.

11. The method of claim 1, wherein computing the score for the media item further comprises:
   determining whether the media item has been featured on an external news website; and
   boosting the score for the media item responsive to determining that the media item has been featured on an external news website.

12. The method of claim 1, wherein computing the score for the media item further comprises:
   determining viewer demographics associated with the media item; and
   responsive to determining that the viewer demographics associated with the media item vary from average demographics by more than a threshold value, reducing the score for the media item.

13. A computer readable storage medium having instructions that, when executed by a processing device, cause the processing device to perform operations comprising:
   computing, by the processing device, scores for a plurality of media items hosted by a content hosting platform, wherein computing a score for a media item of the plurality of media items comprises:
  determining a plurality of positive user actions associated with the media item;
  combining a plurality of score contributions from the plurality of positive user actions to determine a value for the score; and
  applying an exponential decay to the value for the score;
ranking the plurality of media items based on the scores;
filtering out one or more of the plurality of media items that have not been featured by any source external to the content hosting platform; and
populating a popular media item data set with highest ranked media items from a remainder of the plurality of media items, wherein the highest ranked media items have been featured by at least one source external to the content hosting platform.

14. The computer readable storage medium of claim 13, wherein computing the score for the media item further comprises:
  adding the plurality of score contributions to a previous value for the score, wherein the determined plurality of positive user actions are those positive user actions that occurred after the previous value was computed.

15. The computer readable storage medium of claim 13, wherein the plurality of media items comprise a plurality of videos and the plurality of positive user actions comprise a plurality of user views.

16. The computer readable storage medium of claim 15, wherein the plurality of user views comprise a first set of user views having durations that satisfy a first duration threshold and a second set of user views with durations that satisfy a second duration threshold, and wherein a first score contribution is applied to user views from the first set and a second score contribution is applied to user views from the second set.

17. The computer readable storage medium of claim 15, the operations further comprising:
  identifying, from the plurality of user views, subscriber views from subscribers to a media content source of the media item and non-subscriber views from non-subscribers to the media content source, wherein a first score contribution is applied to subscriber views and a second score contribution is applied to non-subscriber views.

18. The computer readable storage medium of claim 15, wherein the plurality of positive user actions further comprises at least one of a plurality of user indications that users like the media item, a plurality of user shares of the media item, or a plurality of user comments on the media item.

19. The computer readable storage medium of claim 13, the operations further comprising:
  determining authors of the plurality of media items; and
  filtering a first media item of the plurality of media items from the popular media items data set if the first media item is authored by an author of a second higher ranked media item in the popular media items data set.

20. The computer readable storage medium of claim 13, wherein computing the score for the media item further comprises:
  determining a user engagement value for the media item based on at least one of user shares of the media item, user indications of interest in the media item, user comments on the media item, user forwarding of the media item and playlists incorporating the media item;
  determining a views value for the media item based on a number of user views of the media item;
  determining a ratio between the views value and the user engagement value; and
  filtering the media item from the popular media items data set responsive to determining that the ratio fails to satisfy a first threshold.

21. The computer readable storage medium of claim 20, further comprising:
  boosting the score for the media item responsive to determining that the ratio satisfies a second threshold.

22. The computer readable storage medium of claim 13, wherein the applied exponential decay has a first exponential decay factor if an age of the media item is less than a threshold age and a second exponential decay factor if the age of the media item is greater than the threshold age.

23. The computer readable storage medium of claim 13, wherein computing the score for the media item further comprises:
  determining whether the media item has been featured on an external news website; and
  boosting the score for the media item responsive to determining that the media item has been featured on an external news website.

24. The computer readable storage medium of claim 13, wherein computing the score for the media item further comprises:
  determining viewer demographics associated with the media item; and
  responsive to determining that the viewer demographics associated with the media item vary from average demographics by more than a threshold value, reducing the score for the media item.

25. A computing device comprising:
a memory; and
a processing device coupled to the memory, the processing device to:
  compute scores for a plurality of media items hosted by a content hosting platform, wherein computing a score for a media item of the plurality of media items comprises:
    determining a plurality of positive user actions associated with the media item;
    combining a plurality of score contributions from the plurality of positive user actions to determine a value for the score; and
    applying an exponential decay to the value for the score;
  rank the plurality of media items based on the scores;
  filter out one or more of the plurality of media items that have not been featured by any source external to the content hosting platform; and
  populate a popular media item data set with highest ranked media items from a remainder of the plurality of media items, wherein the highest ranked media items have been featured by at least one source external to the content hosting platform.

26. The computing device of claim 25, wherein the plurality of media items comprise a plurality of videos, wherein the plurality of positive user actions comprise a first set of user views having durations that satisfy a first duration threshold and a second set of user views with durations that satisfy a second duration threshold, and wherein a first score contribution is applied to user views from the first set and a second score contribution is applied to user views from the second set.

27. The computing device of claim 26, wherein the processing device is further to:

identify, from the plurality of user views, subscriber views from subscribers to a media content source of the media item and non-subscriber views from non-subscribers to the media content source, wherein a first score contribution is applied to subscriber views and a second score contribution is applied to non-subscriber views.

28. The computing device of claim 25, wherein computing the score for the media item further comprises:
   determining a user engagement value for the media item based on at least one of user shares of the media item, user indications of interest in the media item, user comments on the media item, user forwarding of the media item and playlists incorporating the media item;
   determining a views value for the media item based on a number of user views of the media item;
   determining a ratio between the views value and the user engagement value; and
   filtering the media item from the popular media items data set responsive to determining that the ratio fails to satisfy a first threshold.

* * * * *